(12) United States Patent
Wagner et al.

(10) Patent No.: US 12,379,294 B2
(45) Date of Patent: Aug. 5, 2025

(54) LIQUID DENSITY MEASUREMENT DEVICE, SYSTEM AND METHOD

(71) Applicant: Chart Inc., Ball Gorund, GA (US)

(72) Inventors: Roland Wagner, Monheim (DE); Paul Drube, Lakeville, MN (US)

(73) Assignee: Chart Inc., Ball Ground, GA (US)

( * ) Notice: Subject to any disclaimer, the term of this patent is extended or adjusted under 35 U.S.C. 154(b) by 256 days.

(21) Appl. No.: 17/908,996

(22) PCT Filed: Feb. 19, 2021

(86) PCT No.: PCT/US2021/018656
§ 371 (c)(1),
(2) Date: Sep. 2, 2022

(87) PCT Pub. No.: WO2021/183271
PCT Pub. Date: Sep. 16, 2021

(65) Prior Publication Data
US 2023/0102872 A1     Mar. 30, 2023

Related U.S. Application Data

(60) Provisional application No. 62/987,477, filed on Mar. 10, 2020.

(51) Int. Cl.
*G01N 7/00*     (2006.01)
(52) U.S. Cl.
CPC ..................................... *G01N 7/00* (2013.01)
(58) Field of Classification Search
CPC .................................. G01N 7/00; G01N 9/00
USPC ........ 73/32 R, 438, 53.01, 714, 866; 374/16, 374/27, 28, 45, 100, 141–143
See application file for complete search history.

(56) References Cited

U.S. PATENT DOCUMENTS

| | | | |
|---|---|---|---|
| 3,225,174 A * | 12/1965 | Weisend | ............. G05D 23/127 219/494 |
| 4,901,559 A | 2/1990 | Grabner | |
| 2013/0219997 A1* | 8/2013 | Sullivan | ................. E21B 49/10 73/53.01 |

FOREIGN PATENT DOCUMENTS

| | | |
|---|---|---|
| CN | S6179130 Y | 4/1986 |
| CN | 200941073 Y | 8/2007 |
| EP | 2772677 A2 | 9/2014 |
| JP | H0579969 A | 3/1993 |
| JP | 2011521180 A * | 7/2011 |
| KR | 20100047055 A * | 5/2010 |

OTHER PUBLICATIONS

International Search Report and Written Opinion for International Application No. PCT/US2021/018656 Dated May 18, 2021.

* cited by examiner

*Primary Examiner* — Robert R Raevis
(74) *Attorney, Agent, or Firm* — Cook Alex Ltd.

(57) ABSTRACT

A probe assembly for determining a saturation pressure of a liquid includes a manifold having at internal passage and an elongated bulb defining a chamber and having a distal tip portion and a proximal portion. The bulb is secured to the manifold at the proximal end portion with the chamber in fluid communication with the internal passage. A charging port is selectively in fluid communication with the internal passage of the manifold. A pressure transmitter is configured to detect a pressure within the chamber of the elongated bulb.

16 Claims, 3 Drawing Sheets

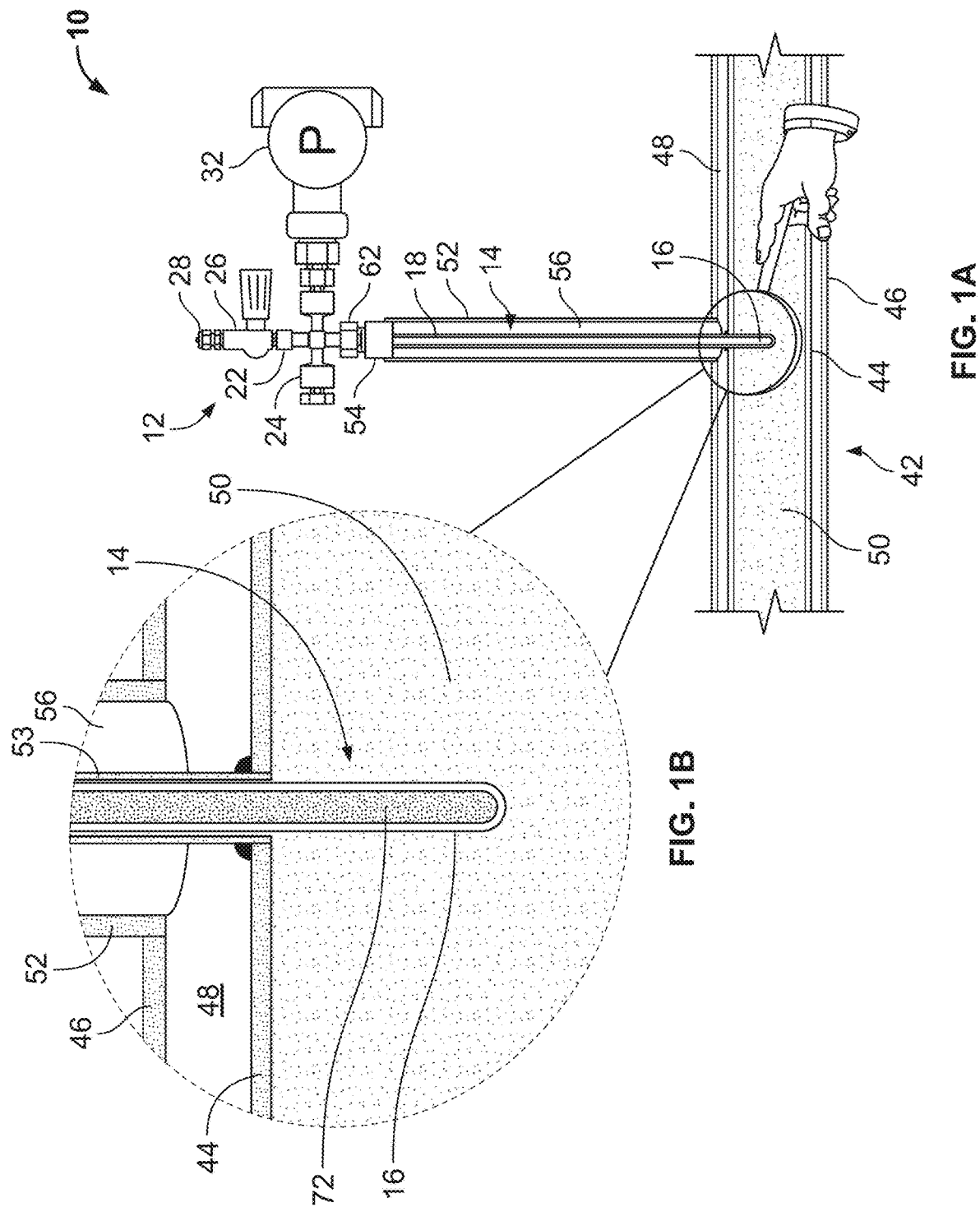

LIQUID DENSITY MEASUREMENT DEVICE, SYSTEM AND METHOD

CLAIM OF PRIORITY

This application is the U.S. National Stage of PCT International Patent Application No. PCT/US2021/018656, filed Feb. 19, 2021, which claims the benefit of U.S. Provisional Application No. 62/987,477, filed Mar. 10, 2020, the contents of each of which are hereby incorporated by reference.

FIELD OF THE INVENTION

The present invention generally relates to liquid delivery and dispensing processes and systems and, more particularly, to a liquid density measurement device, system and method.

BACKGROUND

Liquids that vaporize at or below ambient temperatures, such a cryogenic liquids, are used in a number of applications. Such liquids are typically stored in insulated containers and then dispensed or distributed for use by use devices or in industrial processes. Accurate metering and/or monitoring of the flow rates of the liquids as they are dispensed or delivered is important in many applications. Determining the density of the flowing liquid is necessary for accurate metering and monitoring of the liquid flow rate.

Challenges in measuring the density of flowing liquids are presented by cryogenic liquids due to the very low temperature of the liquids (cryogenic liquids boil at temperatures of −130° F./−90° C.). For example, current technologies for measuring the density of flowing liquids include Resistance Temperature Devices (RTDs), which may encounter operational issues at liquid hydrogen temperatures. Cryogenic Platinum probes, another technology currently in use for flowing liquid density measurement, are not linear at hydrogen temperatures and require calibration. This calibration is challenging and expensive.

Additional challenges are presented if the cryogenic liquid is flammable (such as in the case of hydrogen), especially if electrical components are used for flowing liquid density measurement due to electrical code requirements.

Another technology, diode technologies, are used and very accurate but have the packaging challenges.

Furthermore, many of the prior art technologies used for flowing liquid density measurement are not robust.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a probe assembly for determining a saturation pressure of a liquid includes a manifold having an internal passage. The probe also includes an elongated bulb defining a chamber with a distal tip portion and a proximal portion. The bulb is secured to the manifold at the proximal portion with the chamber in fluid communication with the internal passage. A charging port is selectively in fluid communication with the manifold. A pressure transmitter is configured to detect a pressure within the chamber of the elongated bulb.

In another aspect, a system for determining a saturation pressure of a liquid features a probe assembly including a manifold having an internal passage and an elongated bulb defining a chamber and including a distal tip portion and a proximal portion. The bulb is secured to the manifold by the proximal portion with the chamber containing a pressurized vapor. The chamber also is in fluid communication with the internal passage. A charging port is selectively in fluid communication with the manifold. A pressure transmitter is configured to detect a pressure within the chamber of the elongated bulb. The system also features a jacketed pipe assembly including a pipe defining a flow passage and a jacket surrounding the pipe so that a first annular space is formed, where the annular space is at least partially evacuated of air. The jacketed pipe assembly also includes a probe port to which the probe assembly is attached with the distal tip portion of the bulb positioned within the flow passage of the pipe.

In another aspect, a method for determining a saturation pressure of a liquid in a passage includes the steps of: placing an elongated bulb containing a pressurized vapor into the passage, wherein the vapor and the liquid are the same fluid, and detecting a pressure of the pressurized vapor after the bulb is placed within the passage.

BRIEF DESCRIPTION OF THE DRAWINGS

FIG. 1A is a side elevational view of an embodiment of a probe assembly of the disclosure and a cross-sectional view of a portion of a vacuum jacket pipe assembly prior to liquid flow through the vacuum jacket pipe assembly.

FIG. 1B is an enlarged cross-sectional view of the interface of the probe assembly of FIG. 1A with the vacuum jacket pipe assembly of FIG. 1A.

DETAILED DESCRIPTION OF EMBODIMENTS

Figures 2A, 2B:
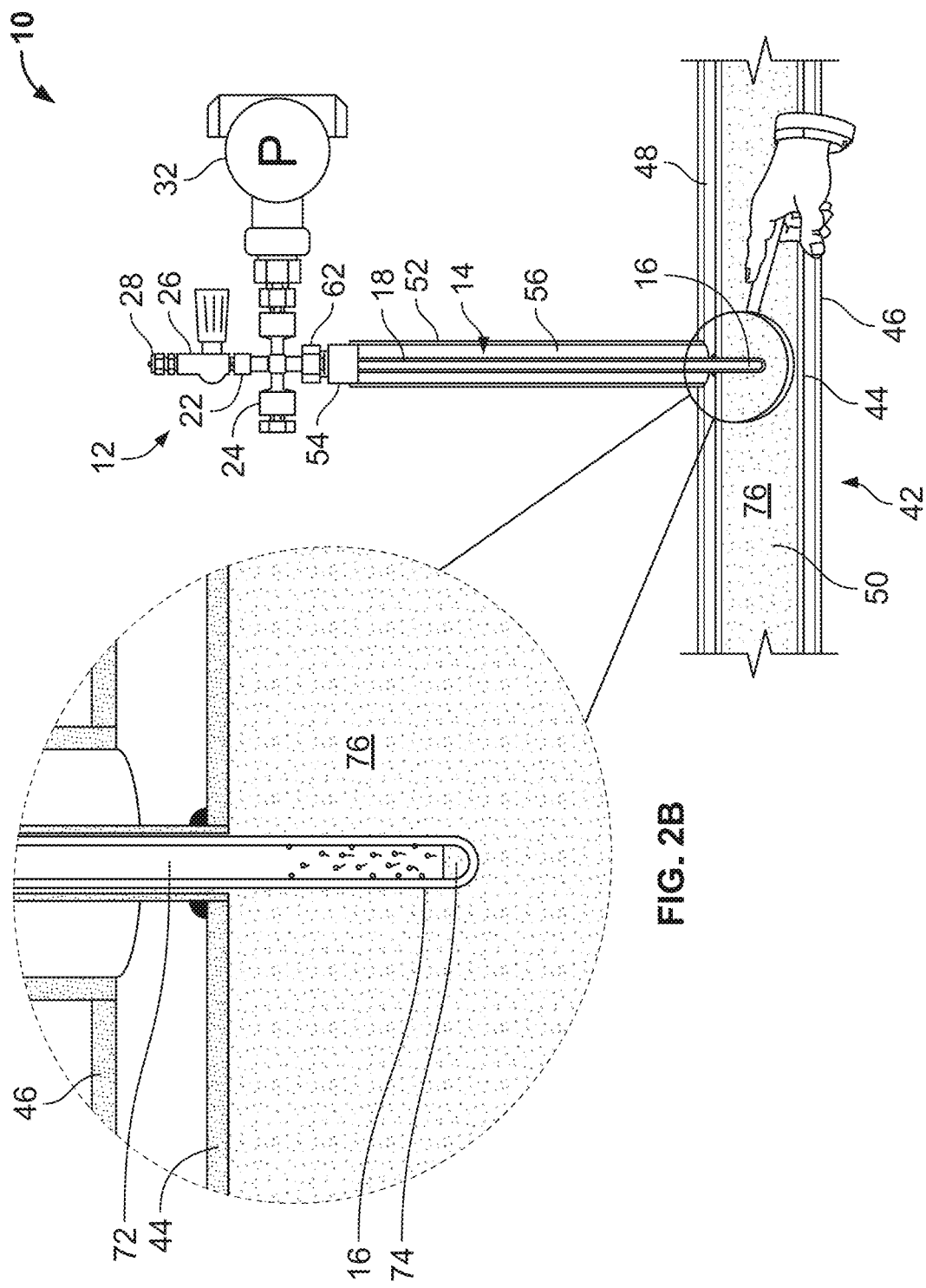
FIG. 2A is a side elevational view of the probe assembly and vacuum jacket pipe assembly of FIG. 1A with the vacuum jacket pipe assembly containing a liquid stream.
FIG. 2B is an enlarged cross-sectional view of the interface of the probe assembly of FIG. 2A with the vacuum jacket pipe assembly of FIG. 2A.

An embodiment of the flowing liquid density measurement system is indicated in general at 10 in FIGS. 1A and 2A. The system includes a probe assembly, indicated in general at 12 in FIGS. 1A and 2A. While the embodiments are described below in terms of hydrogen as the flowing liquid, it is to be understood that embodiments of the disclosure may be used to measure the density of other flowing liquids, including both those that are cryogenic and those that are not cryogenic.

As illustrated in FIG. 1A, the probe 12 includes an elongated bulb, indicated in general at 14. The bulb includes a distal tip portion 16 and a proximal portion 18. The probe 12 also includes a manifold 22 to which the proximal portion of the bulb is attached. A vent valve 24 is also attached to the manifold 22 and, as an example only, may be a burst disk valve. A charging valve 26 having a charging port 28 is also attached to the manifold, as is a pressure transmitter 32. The manifold 22 includes interior passages that are in fluid communication with each other as well as with the bulb 14, vent valve 24, charging valve 26 and charging port 28.

A vacuum jacket pipe assembly, a portion of which is indicated in general at 42 in FIGS. 1A and 2A, directs a stream of liquid from a source to a destination. As an example only, the source may be a vacuum storage tank and the destination may be a use device or an industrial process. The vacuum jacket pipe assembly 42 features an inner pipe 44 surrounded by a jacket 46. The annular space 48 defined therebetween preferably contains a vacuum or is at a near vacuum pressure level. The inner pipe includes a flow passage 50.

A port is formed in the vacuum jacket pipe assembly and includes an outer sleeve 52, an inner sleeve 53 (FIG. 1B) and an end cap fitting 54 having a central opening that communicates with a port central bore (that is surrounded by inner sleeve 53). The annular interior space 56 of the port between the inner sleeve 53 and the outer sleeve 52 is in fluid communication with the annular space 48 between the inner piper 44 and jacket 46. As a result, the port interior space 56 is also at or near vacuum level so as to be well insulated.

The probe assembly 12 is installed in the vacuum jacket pipe assembly 42 by inserting the bulb 14 of the probe assembly into and through the central opening of the end cap fitting 54 and the central bore of the port until the distal tip portion 16 of the bulb is positioned within the flow passage 50 of the vacuum jacket pipe assembly 42, as illustrated in FIGS. 1A and 1B.

An attachment member 62 is provided on the manifold and engages the end cap fitting 54 of the port of the vacuum jacket piper assembly so that the port assembly 12 is removably secured to the jacket pipe assembly 42. As an example only, the attachment member 62 of the probe assembly and the end cap fitting 54 of the vacuum jacket pipe assembly may include threads so that a threaded connection is formed.

In an alternative embodiment, the probe may be permanently installed with respect to the vacuum jacket pipe assembly with the distal tip portion 16 of the bulb positioned within the flow passage 50 of the vacuum jacket pipe assembly 42. Such an embodiment eliminates the need for the outer and inner sleeves (52 and 53) as well as the end cap fitting 54.

With reference to FIG. 1B, the bulb 14 includes a bulb chamber 72 that is pressurized. The bulb chamber 72 is in fluid communication with the passages of the manifold 22 of FIG. 1A. In the embodiment where hydrogen is the liquid that flows through the flow passage 50 of the pipe, the bulb chamber 72 contains hydrogen vapor. As an example only, the chamber 72 is pressurized to approximately 500 psi. In alternative embodiments, the bulb may include an alternative vapor and pressure.

The vapor within the bulb chamber 72 preferably matches the liquid flowing through flow passage 50 (as in the illustrated embodiment, where the chamber 72 includes hydrogen vapor and liquid hydrogen flows through flow passage 50), but embodiments may exist where different fluids may be used within the chamber 72 and the flow passage 50.

The chamber 72 of the bulb 14 may be charged with pressurized vapor by connecting a source of pressurized hydrogen vapor to the charging port 28 and opening charging valve 26. When the chamber 72 has been filled with hydrogen vapor and reaches the appropriate pressure, the valve 26 is closed, and the source of pressurized hydrogen is disconnected from charging port 28.

If the vapor within the chamber 72 of bulb 14 is warmed and exceeds a predetermined pressure level, the safety valve 24 automatically opens and vents vapor from within the chamber to atmosphere.

In FIG. 2A, a stream of pressurized liquid hydrogen 76 flows through the flow passage 50 of the vacuum jacket pipe assembly 42. The distal tip portion 16 of the bulb 14 of the probe assembly 10 therefore is surrounded by the cold hydrogen liquid 76. With reference to FIG. 2B, this causes a portion of the hydrogen vapor within the chamber 72 of the bulb to condense so that condensed vapor 74 puddles or collects in the bottom of the distal tip portion 16. This causes the pressure within the chamber 72 to drop to the saturation pressure corresponding to the temperature of the liquid hydrogen within the flow passage 50. As a result, the pressure within the chamber 72 corresponds to the saturation pressure of the liquid hydrogen within the flow passage 50.

The pressure within the chamber 72 is detected by the pressure transmitter 32 (which also includes pressure detection capability), and is transmitted to a controller (not shown), which may include a microprocessor or other computer device. As an example only, the pressure transmitter may receive power from an onboard battery or an external electrical source. Furthermore, as an example only, a suitable controller includes the FlowCom 3000 controller available from Flow Instruments & Engineering GmbH of Monheim, Germany. The pressure transmission may take place by wireless transmission or by wire.

Figure 3:
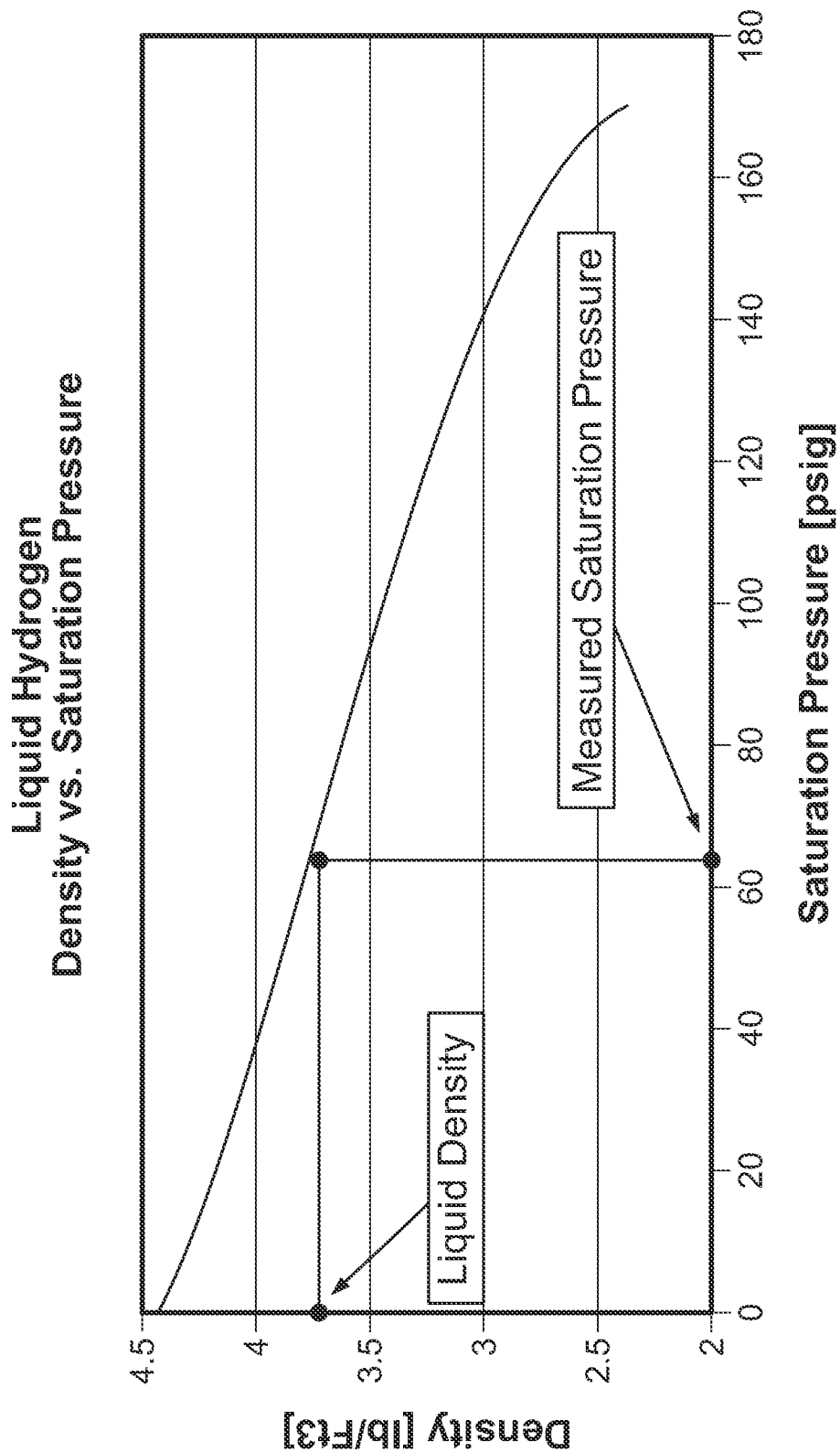
FIG. 3 is a graph of density vs. saturation pressure for liquid hydrogen.

As is known in the art, and illustrated in FIG. 3, once the saturation pressure of a fluid such as liquid hydrogen, is known, the density of the liquid may be determined using density vs. saturation data for the fluid. Upon receipt of the pressure data from the pressure transmitter 32, the controller is programmed to use a combination of polynominals and lookup tables to calculate the temperature and density of the liquid hydrogen stream within the flow passage 50. The controller may then display the temperature and density of the fluid to a user. Alternatively or in addition, the controller may use the received and calculated data to determine a flow rate of the liquid hydrogen within flow passage 50 using equations known in the art.

In some embodiments, the saturation pressure may be used by the controller to first calculate temperature (since the type of fluid is known) with the density calculation following as a second step. The density calculation may optionally be in conjunction with the line pressure within the flow passage 50 of the vacuum pipe assembly so as to take into account the compressibility of the fluid. Such a system requires a second pressure transmitter, such as 32 of FIGS. 1A and 2A, to determine the pressure within flow passage 50. There are several polynominals which enable the controller to calculate the fluid density based on temperature for different pressures. Interpolation is then used to determine the density based upon the exact line pressure reading. Alternatively, a lookup-table may also be used as input data for interpolation.

It is to be understood that the saturation pressure of the liquid hydrogen within the passage 50 of the vacuum pipe assembly 42 of FIGS. 2A and 2B could also be determined if the liquid hydrogen within the passage is in a static, non-flowing condition.

As an example only, in view of the above, embodiments of the disclosure may find use in flow meter designs for hydrogen service. In addition, the above embodiments are robust and rechargeable in the field and leverage transmitter electrical classification (Class 1 div 1 or div 2).

While the preferred embodiments of the invention have been shown and described, it will be apparent to those skilled in the art that changes and modifications may be made therein without departing from the spirit of the invention, the scope of which is defined by the appended claims.

What is claimed is:

1. A system for determining a saturation pressure of a liquid comprising:
    a) a probe assembly including:
        i. a manifold having at internal passage;
        ii. an elongated bulb defining a chamber and including a distal tip portion and a proximal portion, said bulb secured to the manifold by the proximal portion with the chamber containing a pressurized vapor and in fluid communication with the internal passage;
        iii. a charging port selectively in fluid communication with the internal passage of the manifold;
        iv. a pressure transmitter configured to detect a pressure within the chamber of the elongated bulb;
    b) a jacketed pipe assembly including:
        i. a pipe defining a flow passage;
        ii. a jacket surrounding the pipe so that a first annular space is formed, said annular space being at least partially evacuated of air;
        iii. a probe port to which said probe assembly is attached and configured so that the distal tip portion of the bulb is positioned within the flow passage of the pipe, wherein the probe port includes an inner sleeve defining a central bore that is configured to receive the elongated bulb, an end cap fitting having a central opening configured to receive the elongated bulb, and an outer sleeve surrounding the inner sleeve so that a second annular space is defined between the inner and outer sleeves and the end cap fitting, wherein the second annular space is in fluid communication with the first annular space.

2. The system of claim 1 wherein the probe assembly is removably attached to the end cap fitting.

3. The system of claim 1 further comprising a controller, wherein the pressure transmitter is configured to transmit a detected pressure to the controller and the controller is configured to determine a temperature and a density from the detected pressure.

4. The system of claim 1 wherein the liquid is liquid hydrogen and the pressurized vapor is pressurized hydrogen vapor.

5. The system of claim 1 further comprising a safety valve connected to the manifold and in fluid communication with the internal passage.

6. The system of claim 5 wherein the safety valve includes a burst disk.

7. The system of claim 1 wherein the pressure transmitter is mounted to the manifold.

8. The system of claim 1 wherein the charging port is configured to be attached to a supply of pressurized vapor and further comprising a charging valve connected between the charging port and the manifold, said charging valve configured to be moved between an open position, wherein the charging port is in fluid communication with the chamber so that the chamber receives pressurized vapor, and a closed position, wherein the charging port is not in fluid communication with the chamber.

9. The system of claim 1 wherein the chamber is filled with a pressurized vapor.

10. The system of claim 9 wherein the pressurized vapor is a cryogenic vapor.

11. The system of claim 10 wherein the cryogenic vapor is hydrogen vapor.

12. The system of claim 1 wherein the pressure transmitter is configured to transmit a detected pressure to a remote controller.

13. A method of determining a saturation pressure of a liquid in a passage comprising:
    a) attaching a probe assembly to a pipe assembly including the liquid passage, the probe assembly including:
        a manifold having an internal passage and configured to be sealingly engaged to an end cap fitting of a port of the pipe assembly;
        an elongated bulb defining a chamber and having a distal tip portion and a proximal portion, said bulb secured to the manifold at the proximal end portion with the chamber in fluid communication with the internal passage;
        a charging port selectively in fluid communication with the internal passage of the manifold; and
        a pressure transmitter configured to detect a pressure within the chamber of the elongated bulb;
    and the pipe assembly including
        a jacket surrounding the pipe so that a first annular space is formed, said annular space being at least partially evacuated of air;
        a probe port to which said probe assembly is attached and configured so that the distal tip portion of the bulb is positioned within the flow passage of the pipe, wherein the probe port includes an inner sleeve defining a central bore that is configured to receive the elongated bulb, the end cap fitting having a central opening configured to receive the elongated bulb, and an outer sleeve surrounding the inner sleeve so that a second annular space is defined between the inner and outer sleeves and the end cap fitting, wherein the second annular space is in fluid communication with the first annular space;
    b) placing the elongated bulb containing a pressurized vapor into the passage, wherein the vapor and the liquid are the same fluid; and
    c) detecting a pressure of the pressurized vapor after the bulb is placed within the passage.

14. The method of claim 13 wherein the fluid is hydrogen.

15. The method of claim 13 further comprising the step of transmitting the detected pressure to a remote controller.

16. The method of claim 15 further comprising the steps of calculating a temperature and a density using the detected pressure and the controller.

* * * * *